United States Patent
Tikkanen et al.

Patent Number: 6,115,716
Date of Patent: Sep. 5, 2000

[54] METHOD FOR IMPLEMENTING AN ASSOCIATIVE MEMORY BASED ON A DIGITAL TRIE STRUCTURE

[75] Inventors: Matti Tikkanen, Espoo; Jukka-Pekka Iivonen, Helsinki, both of Finland

[73] Assignee: Nokia Telecommunications Oy, Espoo, Finland

[21] Appl. No.: 09/389,498

[22] Filed: Sep. 3, 1999

Related U.S. Application Data

[63] Continuation of application No. PCT/FI98/00191, Mar. 4, 1998.

[30] Foreign Application Priority Data

Mar. 14, 1997 [FI] Finland ................................ 971066

[51] Int. Cl.[7] ............................................ G06F 17/30
[52] U.S. Cl. ......................... 707/100; 707/101; 707/102
[58] Field of Search .................................. 707/100, 101, 707/102

[56] References Cited

U.S. PATENT DOCUMENTS

| | | | |
|---|---|---|---|
| Re. 35,881 | 8/1998 | Barrett et al. | 707/1 |
| 5,247,658 | 9/1993 | Barrett et al. | 707/100 |
| 5,276,868 | 1/1994 | Poole | 707/3 |
| 5,319,777 | 6/1994 | Perez | 707/10 |
| 5,392,427 | 2/1995 | Barrett et al. | 707/100 |
| 5,423,034 | 6/1995 | Cohen-Levy et al. | 707/100 |
| 5,848,416 | 8/1998 | Tikkanen | 707/101 |
| 5,960,173 | 9/1999 | Tang et al. | 395/200.31 |
| 6,011,897 | 1/2000 | Koyama et al. | 386/95 |

FOREIGN PATENT DOCUMENTS

| | | |
|---|---|---|
| 375 307 | 6/1990 | European Pat. Off. . |
| 408 188 | 1/1991 | European Pat. Off. . |
| 408 198 | 6/1991 | European Pat. Off. . |
| 630 131 | 4/1995 | European Pat. Off. . |
| 650 131 | 4/1995 | European Pat. Off. . |
| WO 98/34155 | 12/1995 | WIPO . |
| WO95/34155 | 12/1995 | WIPO . |

OTHER PUBLICATIONS

K–tree container data structures: fast subscripting, slicing, and concatenation of sequences.; Rodney Bates; *Dr. Dobb's Journal*; Sep.1994; vol. 19, No. 10, p. 26(5).

(List continued on next page.)

*Primary Examiner*—Thomas G. Black
*Assistant Examiner*—Frantz Coby
*Attorney, Agent, or Firm*—Altera Law Group LLC

[57] ABSTRACT

The invention relates to a method for implementing a memory. The memory is implemented as a directory structure comprising a tree-shaped hierarchy having nodes at several different levels, wherein an individual node can be (i) a trie node comprising an array wherein an individual element may contain the address of a lower node in the tree-shaped hierarchy and wherein an individual element may also be empty, or (ii) a bucket containing at least one element so that the type of an individual element in the bucket is selected from a group including a data unit, a pointer to a stored data unit, a pointer to another directory structure and another directory structure. To minimize storage space requirement, the arrays in the trie nodes are implemented as quad nodes having a fixed size of four elements, and in at least part of the directory structure sets of successive quad nodes are replaced with compressed nodes in such a way that an individual set made up by successive quad nodes, from each of which there is only one address to a quad node at a lower level, is replaced with a compressed node (CN) storing an address to the quad node that the lowest node in the set to be replaced points to, information on the value of the search word by means of which said address is found, and information on the total number of bits from which search words are formed in the set to be replaced. The invention also relates to a structure in which buckets are not employed.

10 Claims, 5 Drawing Sheets

OTHER PUBLICATIONS

Fast IP routing with LC–Tries; achieving gbit/see speed in software, (Internet/Web/Online Service Information); Stefan Nilsson et al.; *Dr. Dobb's Journal;* Aug. 1998; vol. 23, No. 8, p. 70 (5).

Patent Abstracts of Japan, Abstract of JP 8–194719 (Fujitsu Ltd.); Jul. 30, 1996.

"Approximate Average Storage Utilization of Bucket Methods with Arbitrary Fanout" Ang, et al. Nordic Journal of Computing Mar. 2, 1996, pp. 280–291.

K–tree container data structures: that subscripting, slicing, and concentration of sequences: Rodney Bates: *Dr. Dobb' Journal:* Sep. 1994: vol. 19, No. 10, p. 26(5).

Fast IP routing with LC–Tries; schieving gbit/see speed in software, (Internet/Web/Online Service Information), Stefan Nilsson et al., *Dr.Dobb'Journal:* Aug. 1998; vol. 23, No. 8, p. 70 (5).

Patents Abstracts of Japan, Abstract of JP 8–194719 (Fujitsu Ltd.); Jul 30, 1996.

METHOD FOR IMPLEMENTING AN ASSOCIATIVE MEMORY BASED ON A DIGITAL TRIE STRUCTURE

This application is a continuation of international application number PCT/FI98/00191, filed Mar. 4, 1998, pending.

FIELD OF THE INVENTION

The present invention generally relates to implementation of an associative memory, particularly to implementation of an associative memory based on a digital trie structure. The solution in accordance with the invention is intended for use primarily in connection with central memory databases. Suitable applications particularly include databases in which there are a large number of insertions and deletions compared to retrievals. Such applications include visitor location registers (VLR) in mobile communications networks.

BACKGROUND OF THE INVENTION

The prior art unidimensional directory structure termed digital trie (the word "trie" is derived from the English word "retrieval") is the underlying basis of the principle of the present invention. Digital tries can be implemented in two types: bucket tries, and tries having no buckets.

A digital bucket trie structure is a tree-shaped structure composed of two types of nodes: buckets and trie nodes. A bucket is a data structure containing a number of data units or a number of pointers to data units or a number of search key/pointer pairs (the number may include only one data unit, one pointer or one key/pointer pair). A trie node, on the other hand, is an array guiding the retrieval, having a size of two by the power of k ($2^k$) elements. If an element in a trie node is in use, it refers either to a trie node at the next level in the directory tree or to a bucket. In other cases, the element is free (empty).

Search in the database proceeds by examining the search key (which in the case of a subscriber database in a mobile telephone network or a telephone exchange, for instance, is typically the binary numeral corresponding to the telephone number of the subscriber) k bits at a time. The bits to be searched are selected in such a way that at the root level of the structure (in the first trie node), k leftmost bits are searched; at the second level of the structure, k bits next to the leftmost bits are searched, etc. The bits to be searched are interpreted as an unsigned binary integer that is employed directly to index the element array contained in the trie node, the index indicating a given element in the array. If the element indicated by the index is free, the search will terminate as unsuccessful. If the element refers to a trie node at the next level, k next bits extracted from the search key are searched at that level in the manner described above. As a result of comparison, the routine branches off in the trie node either to a trie node at the next level or to a bucket. If the element refers to a bucket containing a key, the key stored therein is compared with the search key. The entire search key is thus compared only after the search has encountered a bucket. Where the keys are equal, the search is successful, and the desired data unit is obtained at the storage address indicated by the pointer of the bucket. Where the keys differ, the search terminates as unsuccessful.

A bucketless trie structure has no buckets, but reference to a data unit is effected from a trie node at the lowest level of a tree-shaped hierarchy, called a leaf node. Unlike buckets, the leaf nodes in a bucketless structure cannot contain data units but only pointers to data units. Also a bucket structure has leaf nodes, and hence trie nodes containing at least one pointer to a bucket (bucket structure) or to a data unit (bucketless structure) are leaf nodes. The other nodes in the trie are internal nodes. Trie nodes may thus be either internal nodes or leaf nodes. By means of buckets, the need for reorganizing the directory structure can be postponed, as a large number of pointers/data units can be accommodated in the buckets until a time when the need for reorganization arises.

The solution in accordance with the invention can be applied to a bucket structure as well as a bucketless structure. In the following, bucket structures will nevertheless be used as examples.

Figure 1:
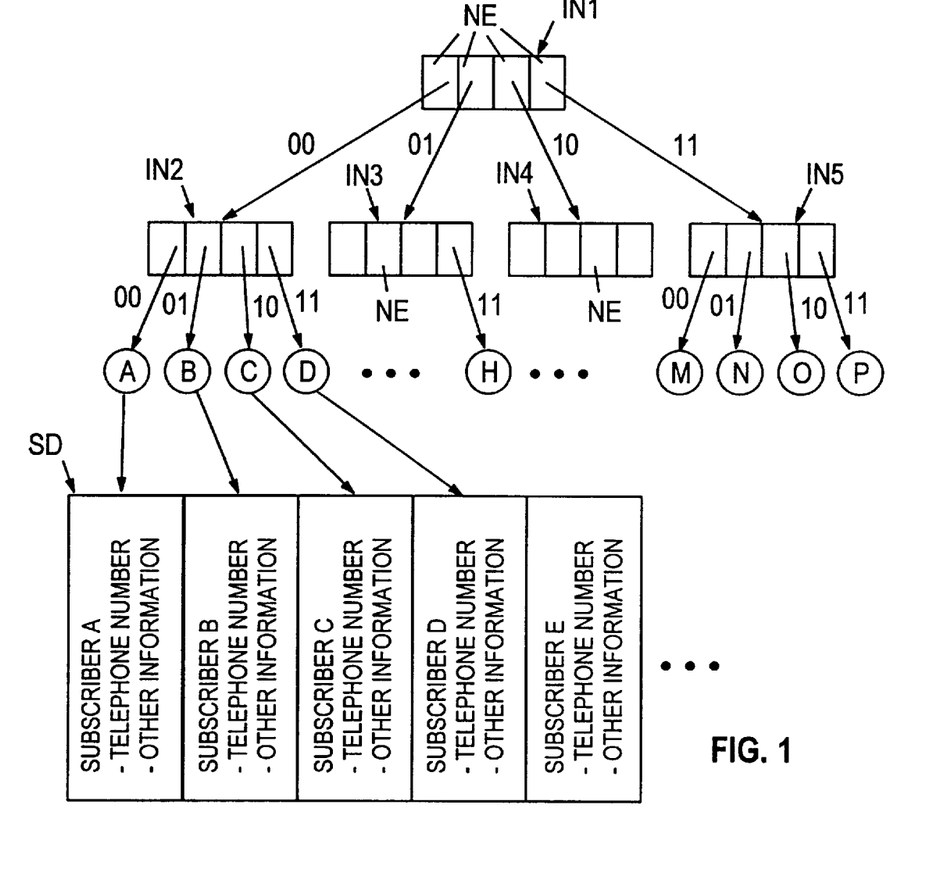
FIG. 1 illustrates the use of a unidimensional digital trie structure in the maintenance of subscriber data in a telephone exchange.

FIG. 1 illustrates an example of a digital trie structure in which the key has a length of 4 bits and k=2, and thus each trie node has $2^2$=4 elements, and two bits extracted from the key are searched at each level. Buckets containing a record are denoted with references A, B, C, D ... H ... M, N, O and P. Thus a bucket is a node that does not point to a lower level in the tree. Trie nodes are denoted with references IN1 ... IN5 and elements in the trie node with reference NE in FIG. 1.

In the exemplary case of FIG. 1, the search keys for the buckets shown are as follows: A=0000, B=0001, C=0010, ..., H=0111, ... and P=1111. In this case, a pointer is stored in each bucket to that storage location in the database SD at which the actual data, e.g. the telephone number of the pertinent subscriber and other information relating to that subscriber, is to be found. The actual subscriber data may be stored in the database for instance as a sequential file of the type shown in the figure. The search is performed on the basis of the search key of record H, for example, by first extracting from the search key the two leftmost bits (01) and interpreting them, which delivers the second element of node IN1, containing a pointer to node IN3 at the next level. At this level, the two next bits (11) are extracted from the search key, thus yielding the fourth element of that node, pointing to record H.

Instead of a pointer, a bucket may contain (besides a search key) an actual data file (also called by the more generic term data unit). Thus for example the data relating to subscriber A (FIG. 1) may be located in bucket A, the data relating to subscriber B in bucket B, etc. Thus in the first embodiment of an associative memory, a key-pointer pair is stored in the bucket, and in the second embodiment a key and actual data are stored, even though the key is not indispensable.

The search key may also be multidimensional. In other words, it may comprise a number of attributes (for example the family name and one or more forenames of a subscriber). Such a multidimensional trie structure is disclosed in international application No. PCT/FI95/00319 (published under number WO 95/34155). In said structure, address computation is performed in such a way that a given predetermined number of bits at a time is selected from each dimension independently of the other dimensions. Hence, a fixed limit independent of the other dimensions is set for each dimension in any individual trie node of the trie structure, by predetermining the number of search key bits to be searched in each dimension. With such a structure, the memory circuit requirement can be curbed when the distribution of the values of the search keys is known in advance, in which case the structure can be implemented in a static form.

It has been found in practice, however, that an optimum fill rate for trie nodes in view of storage space occupancy cannot always be achieved with this structure (with all key distributions).

SUMMARY OF THE INVENTION

It is an objective of the present invention to remove the above drawback and to provide a method wherewith, in a structure employing fixed node size, memory space requirement can be maintained as small as possible and memory management can be maintained effective, particularly in databases in which there are a large number of insertions and deletions.

This objective is achieved with the solution defined in the independent claims. The first of these discloses a structure employing buckets and the second a structure not employing buckets.

The idea of the invention is to use in the structure a fixed node size of four (elements) and to replace successive quad nodes providing only one path downward in the tree with (one or more) compressed node(s) in which the information needed for proceeding in the structure and for restructuring the nodes is collected from one or more successive quad nodes, without any storage space being needed for element arrays. Thus, the idea is to use an optimum node size in view of storage space requirement and memory efficiency, and moreover to further diminish storage space requirement for successive quad nodes providing only one path downward in the tree (and not having an optimum fill rate). In other words, the idea is to curb storage space requirement particularly in conjunction with non-uniform key distributions by reducing the depth of the structure by means of compressed nodes.

The solution in accordance with the invention also ensures effective performance of set operations, as the structure is an order-preserving digital trie.

BRIEF DESCRIPTION OF THE DRAWINGS

In the following the invention and its preferred embodiments will be described in closer detail with reference to examples in accordance with the accompanying drawings, in which.

DETAILED DESCRIPTION OF THE INVENTION

Figure 2:
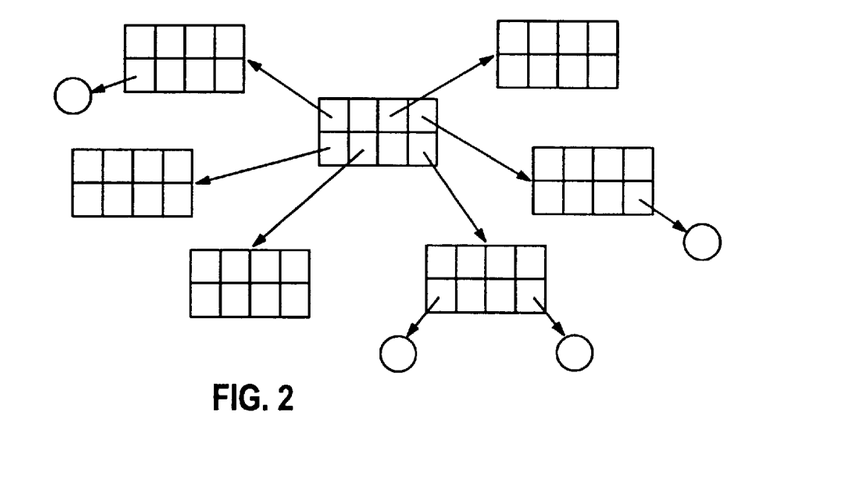
FIG. 2 shows a multidimensional trie structure.

As stated previously, in the present invention the trie structure has a multidimensional (generally n-dimensional) implementation. Such a multidimensional structure is otherwise fully similar to the unidimensional structure described at the beginning, but the element array contained in the trie node is multidimensional. FIG. 2 exemplifies a two-dimensional $2^2*2^1$ structure, in which one dimension in the element array comprises four elements and the other dimension two elements. Buckets pointed to from the elements in the trie node are indicated with circles in the figure.

Address computation in the multidimensional case is performed on the same principle as in the unidimensional case. The fundamental difference, however, resides in that instead of a single element array index, an index is calculated for each dimension in the element array (n indices). Each dimension thus has a search key space of its own $\{0, 1, \ldots, 2^{v_i}-1\}$ ($v_i$ is the length of the search key in bits in each dimension and $i \in \{1, \ldots n\}$).

The size of the trie node in the direction of each dimension is $2^{k_i}$ elements, and the total number of elements S in the trie node is also a power of two:

$$S = \Pi 2^{k_i} = 2^{k_1} \times 2^{k_2} \times 2^{k_3} x \ldots = 2^N \qquad (1)$$

All elements in a trie node having n dimensions can thus be pointed to by n integers ($n \geq 2$), each of which may have a value in the range $\{0, 1 \ldots 2^{k_i}-1\}$. Thus the predetermined fixed parameter is the total length of the search key in each dimension. If for example one dimension of the search key has 256 attributes (such as first names) at most, the total length of the search key is 8 bits.

Figure 3:
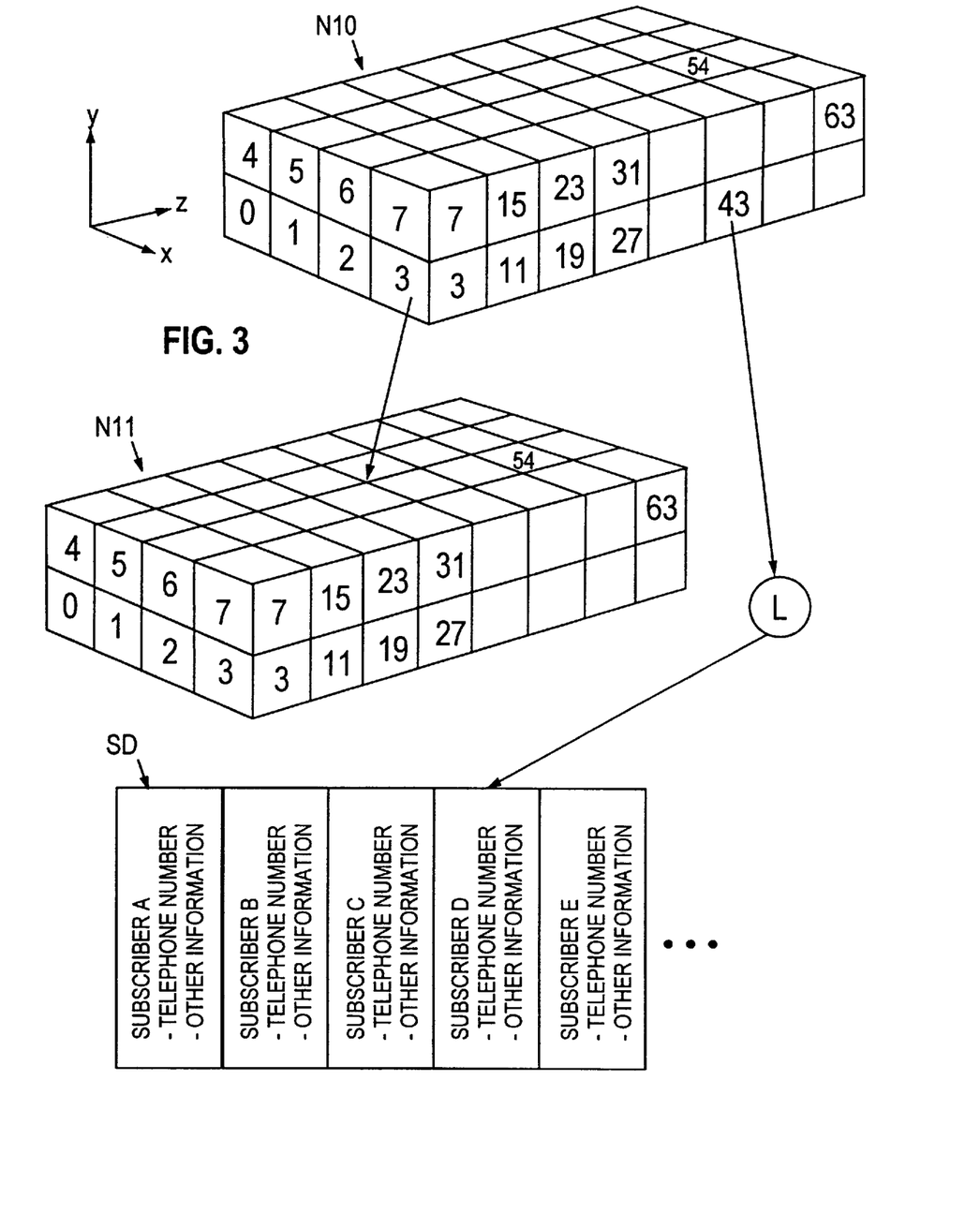
FIG. 3 shows a three-dimensional memory structure.

FIG. 3 shows an example of a node N10 used in the directory structure of the memory, employing a three-dimensional search key. In the direction of the first dimension (x), the trie node has $2^2=4$ elements, in the direction of the second dimension (y) $2^1=2$ elements, and in the direction of the third dimension (z) $2^3=8$ elements, which gives a total of $2^6=64$ elements in the trie node, numbered 0 . . . 63.

Since the memory space in practical hardware implementations (for example computer equipment) is unidimensional, the multidimensional array is linearized, i.e. converted to be unidirectional, in the address computation operation (that is, in proceeding in the directory tree). The linearization is an arithmetic operation that can be performed on arrays of all sizes. Hence, it is irrelevant whether the trie nodes are considered to be unidimensional or multidimensional, as multidimensional arrays are linearized in any case to be unidimensional.

In linearization, the elements in the array are numbered starting from zero (as shown in FIG. 3), the number of the last element being one less than the product of the sizes of all dimensions. The number of an element is the sum of the products of each coordinate (for example in the three-dimensional case, the x, y and z coordinates) and the sizes of the dimensions preceding it. The number thus computed is employed directly to index the unidimensional array.

In the case of the trie node shown in FIG. 3, the element number $VA_n$ is calculated in accordance with the above with the formula:

$$VA_n = x + y \times 4 + z \times 4 \times 2 \qquad (2)$$

where $x \in \{0,1,2,3\}$, $y \in \{0,1\}$ and $z \in \{0,1,2,3,4,5,6,7\}$. Thus for example for element 54 we obtain from the coordinates thereof (2,1,6): $2+1 \times 4+6 \times 4 \times 2=2+4+48=54$.

When the (n-dimensioned) element array of a trie node of an n-dimensional trie structure is linearized, in accordance with the above the size of each dimension is $2^{k_i}$, where $k_i$ is the number of bits to be searched at a time in the dimension concerned. If a coordinate in accordance with the dimension is denoted by reference $a_j$ ($j \in \{0,1,2 \ldots n\}$), the linearization can be written out as $$\sum_{j=1}^{n} a_j \prod_{i=0}^{j-1} 2^{k_i}, \forall j : a_j \in \{0, 1, 2, \ldots, 2^{k_j} - 1\} \wedge k_0 = 0 \quad (3)$$

The linearization can be carried out by performing a multiplication in accordance with formula (3); yet it is expedient to perform the linearization by forming from the search key bits a bit string by known methods, the corresponding numeral indicating the element whose content provides the basis for proceeding in the directory tree. Such a linearization method is termed bit interleaving.

As stated previously, it has been found in practice that the solution disclosed in the international application referred to at the beginning is not capable of achieving optimum storage space occupancy in all conditions (with all key distributions). When this fact is studied mathematically, it can be shown that the average storage space occupancy E of the trie nodes in an n-branched trie structure (n-ary trie) with uniform key distributions is in accordance with Formula (4)

$$E = \frac{n \log e}{m \log n} v - \frac{n}{n-1} \quad (4)$$

where n is the size of the array in the trie node, m is the maximum number of pointers in the bucket, v is the number of records in the entire structure, and e is neper. Formula (4) can be deduced from the formulae disclosed in the article C. H. Ang and H. Samet, Approximate average storage utilization of bucket methods with arbitrary fanout, Nordic Journal of Computing 3 (1996), pp. 280–291 (also Computer Science TR 3618).

In Formula (4), the essential factor for the invention is that it has minima for values 2 and 4 of parameter n. Thus, storage space occupancy is at its minimum with values 2 and 4. Of these values, value 4 is selected for use in the memory in accordance with the invention, since this will allow smaller depth in the structure and higher efficiency (rapidity) in the memory. In the present invention, therefore, the trie structure is implemented as a dimension-independent 4-branched (quad) structure. This means that the number n of the above-described dimensions may have any value, yet the number of bits to be searched in the trie nodes is fixed, i.e. two (with the exception of compressed nodes, which will be described later). In other words, four is selected as the fixed size of all ordinary trie nodes in the structure, regardless of the number of dimensions employed. Such trie nodes will also be termed quad nodes herein-below.

Figure 4:
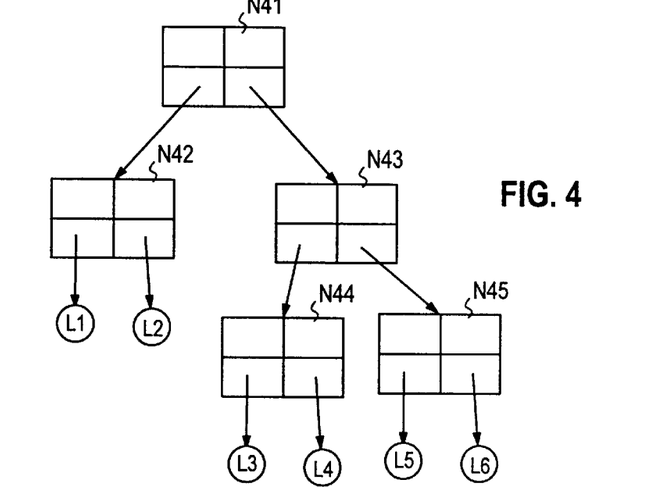
FIG. 4 illustrates a memory structure in accordance with the invention.

One such structure is illustrated in FIG. 4. The figure depicts five ordinary quad nodes N41 . . . N45, having altogether six pointers to buckets (L1 . . . L6). In addition to quad nodes and buckets, the structure may also have compressed nodes, which will be described in detail later.

Figure 5:
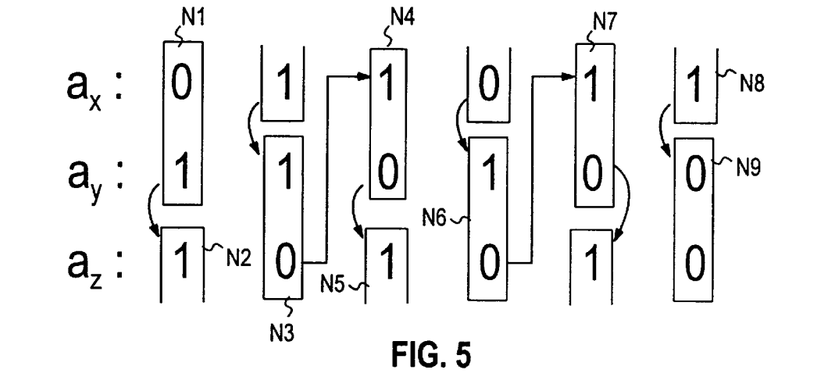
FIG. 5 illustrates implementation of address computation in the memory of the invention.

FIG. 5 illustrates an example of address computation performed in trie nodes in the memory in accordance with the invention. It has been presumed in the figure that the space is three-dimensional (dimensions x, y and z), but as stated above, the number of spatial dimensions can be arbitrary. It has further been presumed that search key $a_x$ in the direction of dimension x is $a_x$=011011, search key $a_y$ in the direction of dimension y is $a_y$=110100 and search key $a_z$ in the direction of dimension z is $a_z$=101010. The search keys are listed in vertical sequence in the figure.

In the nodes of the trie structure, the indexing bits of the unidimensional element array are shown in frames denoted by continuous lines. These frames illustrate how a global search key is divided into local search keys, each being used in one node of the trie structure. The nodes in the structure are denoted by references N1 . . . N9 in the order of progress. Two bits are searched in each node, and thus in the first node the leftmost bit of search key $a_x$ and the leftmost bit of search key $a_y$ are used. Thereafter the routine proceeds in the direction of the arrow to the next node (N2), in which the element array index is formed by the next two bits. These are the leftmost bit in search key $a_z$ and the next to the leftmost bit in search key $a_x$. Proceeding in this way, the following node-specific element array indices are obtained: 01 (node N1), 11 (node N2), 10 (node N3), 10 (node N4), 10 (node N5), 10 (node N6), 10 (node N7), 11 (node N8) and 00 (node N9).

Since the number of bits to be searched in each trie node is constant, i.e. two, the number of searched bits need not be stored in the node. In its minimum configuration, the node thus only comprises an element array having four elements. For proceeding in the directory tree, the type of each node must additionally be known. This data can be stored in the directory structure for example in each node or in the pointer of the parent of the node. By means of the two "extra" bits of the pointer, information can be encoded in the pointer on whether a zero pointer (an empty element) is concerned or whether the pointer points to an ordinary trie node, a bucket or a compressed trie node (which will be described hereinbelow). In the case of a bucketless structure, information on whether the pointer points to an uncompressed node, a compressed node or a data unit is stored.

Since the address computation is performed by using bit interleaving known per se, the address computation will not be describer in further detail.

To further minimize storage space occupancy, compressed nodes are formed from the quad nodes in certain cases. If an ordinary quad node has only one child, this means that only one path "downward" in the tree passes through said quad node. To optimize memory space occupancy, a quad node containing only a single pointer (path downward) should preferably be replaced with a compressed node in which the number of bits searched in said path and the computed array index value are disclosed. Since it is advantageous from the point of view of storage space requirement to form compressed nodes from single-child quad nodes throughout the entire memory structure, compression also means that at least two child nodes are always maintained for ordinary (uncompressed) quad nodes in the memory structure, that is, an individual (ordinary) quad node has pointers to at least two different lower-level nodes (child nodes). A compressed node replaces one or more successive internal nodes, each of which has one child, and hence the above-stated one child cannot be a bucket (or a leaf in a structure that has no buckets). Hence, a child node must be an ordinary quad node in order for compression to be possible. From the point of view of optimizing storage space, it is thus advantageous to always maintain at least two child nodes for quad nodes preceding a bucket as well.

Figures 6A, 6B:
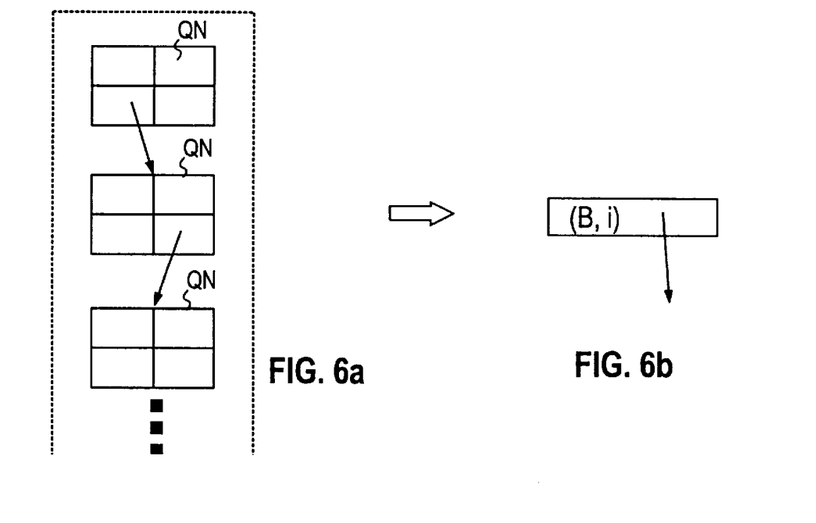
FIGS. 6a and 6b illustrate replacement of quad nodes with comressed nodes.

FIGS. 6a and 6b illustrate the principle of forming compressed quad nodes. If a situation in accordance with FIG. 6a in which only one path passes through one or more successive quad nodes QN is created in the structure, the quad nodes in said path can be replaced with one compressed node CN (FIG. 6b), having information on the number of searched bits B, an element array index i, and a pointer to a child node. This child node is always an ordinary quad node.

In other words, the compressed node does not point to a bucket. If the number of search key bits searched in said path is greater than the word length used in the computer employed, more than one compressed nodes are needed to replace the quad nodes in said path.

The memory in accordance with the invention thus comprises two types of trie nodes: ordinary quad nodes containing an element array in accordance with FIG. 5, and compressed nodes that will be described in the following.

Figure 7A:
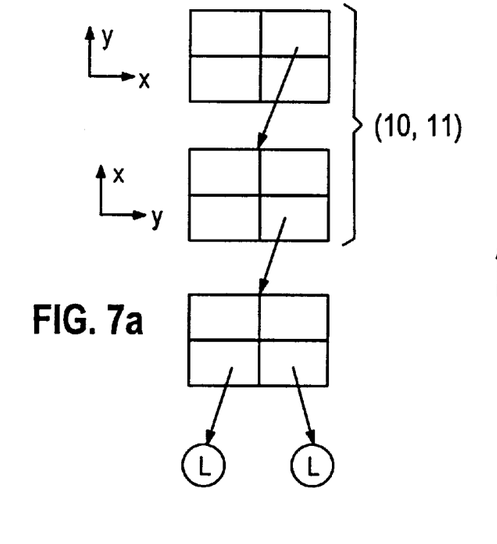
FIGS. 7a and 7b show the principle of forming a compressed node.
Figure 7B:
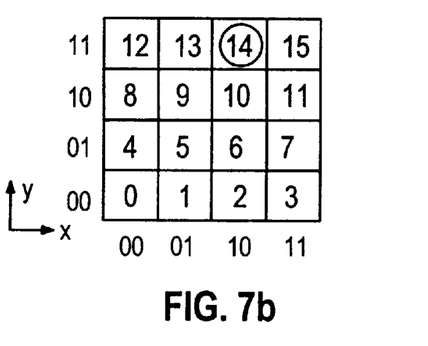

FIGS. 7a and 7b illustrate the forming a compressed quad node. FIG. 7a shows a local trie structure made up by three quad nodes, providing only one path for the two uppermost nodes. These two nodes can be replaced with one element array shown in FIG. 7b. Since the structure has a single path for said nodes, only one element of the array is in use, which in this exemplary case is element 14 circled in the figure (14=1011 when the bits are taken in line order, i.e. the x bits first and thereafter the y bits). Thus, for the two uppermost nodes the trie structure of FIG. 7a can be replaced with a compressed quad node in which the number of bits to be searched (4) and the value of the array index (14) are stored.

Figure 8A:
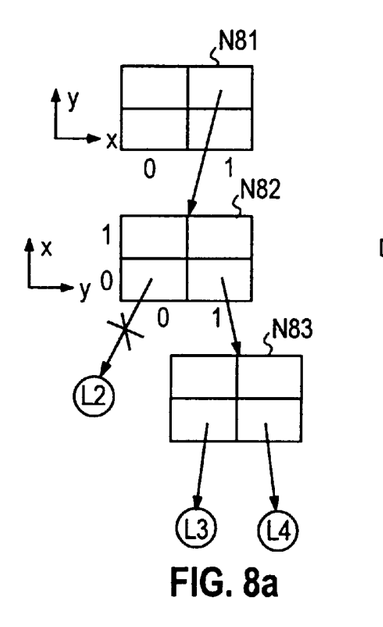
FIGS. 8a and 8b show an example of the maintenance of the memory structure.
Figure 8B:
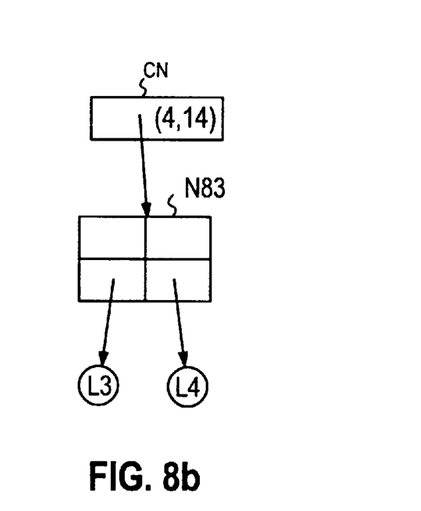

FIGS. 8a and 8b show a maintenance example corresponding to the previous figure when data units and associated keys are deleted from a database. FIG. 8a shows an initial situation in which the memory structure comprises trie nodes N81 . . . N83 and buckets L2 . . . L4. Thereafter bucket L2 and the pointer/record contained therein is deleted from the memory, as a result of which nodes N81 and N82 can be replaced with a compressed node CN, in which the index of the pointer contained in the node and the number of bits searched in the path replaced by the compressed node are disclosed.

Hence, the compressed node is in principle similar to an ordinary quad node, but instead of an element array with only one pointer being stored, the index of the pointer concerned and the number of bits searched in the path are stored. A compressed node thus has a virtual array replacing the information contained in the one or more node arrays existing in the path. If the compressed node replaces several ordinary quad nodes, the number of searched bits indicated in the compressed node is equal to the sum of the numbers of bits searched in the replaced nodes.

Figure 9:
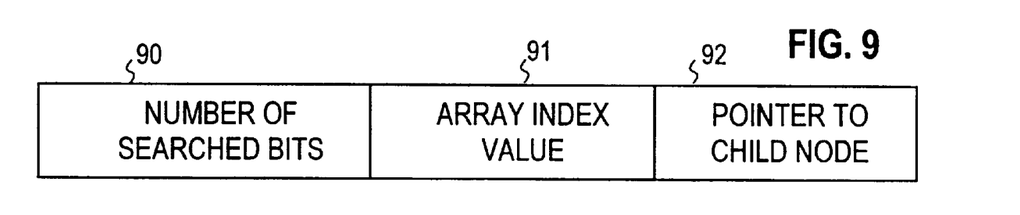
FIG. 9 illustrates the structure of a compressed node employed in the memory.

FIG. 9 illustrates the structure of a compressed node. The minimum configuration of the node comprises 3 parts: field 90 indicating the number of searched bits, field 91 storing the value of the array index, and field 92 storing a pointer to a child node. The compressed node is in need of this data in order for the search to proceed with the correct value at the compressed node as well, and in order for the restructuring of the node to be possible in connection with changes in the structure. (Without information on the number of searched bits, the array index value cannot be calculated from the search key, and on the other hand without the array index value the calculated value could not be compared to the value stored in the node.)

If a collision occurs in the compressed node in connection with an insertion, i.e. the compressed node will have a new pointer, it is studied which bit in order distinguishes the index of the initial pointer and the index of the new pointer. Accordingly, a structure replacing the initial compressed node is created, in which the new compressed node comprises the number of index bits insofar as there are common bits. In addition, one or more trie nodes are created in the structure at points corresponding to those bits in which the indices differ from one another.

If the compressed node is preceded by one or more compressed nodes or a chain of trie nodes providing only a single path, it is advantageous in view of storage space requirement and memory efficiency to further combine said nodes. Moreover, in view of memory efficiency it is advantageous to carry out the combination of nodes in such a way that only in the compressed node that is the last (lowest) in the chain the number of searched bits is smaller than the word length in the computer used. In other words, nodes are combined in such a way that the number of searched bits will be as large as possible in each compressed node. For example, three successive compressed nodes in which the numbers of searched bits are 5, 10 and 15 can be combined into one compressed node in which the number of searched bits is 30. Likewise, for example three successive compressed nodes (or three successive ordinary trie nodes providing only one path) can be combined into two compressed nodes in which the numbers of searched bits are 32 and 3, with the word length employed being 32. Hence, it is attempted to obtain in as many compressed nodes as possible a number of searched bits corresponding to the word length of the computer, and the possible "superfluous" bits are left for the compressed node that is lowest in the hierarchy.

However, compressed nodes cannot be combined so as to make the number of bits searched in one node higher than the word length in the computer employed. Particularly in multidimensional cases (n>3), it is common that there are so many successive nodes containing one child that the path cannot be represented by a single compressed node. Therefore, the search path or part thereof is replaced with a chain made up by several successive compressed nodes, in which the number of searched bits is the same as the word bit number, for example 32 in the Intel architecture, except for the last node where the number of bits is smaller than or equal to the word bit number.

Figure 10A:
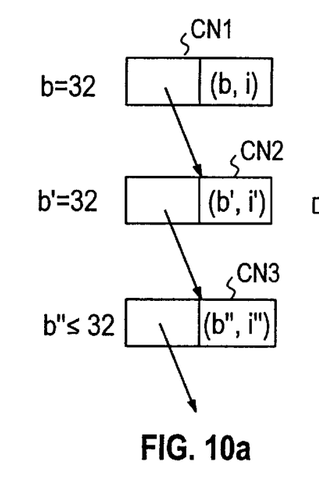
FIG. 10a illustrates the limitation posed by the word length employed on combining the nodes.

Such a situation is depicted in FIG. 10a, showing three successive compressed nodes CN1 . . . CN3. The numbers of bits searched in the nodes are denoted by references b, b' and b" and the values of the array indices contained in the nodes with i, i' and i", respectively. In the two uppermost nodes, the number of searched bits has a maximum value (providing that a 32-bit computer architecture is used).

Figure 10B:
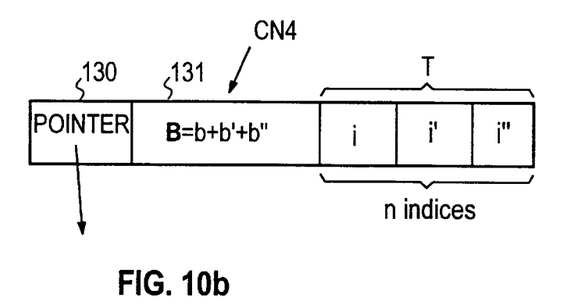
FIG. 10b shows the structure of a collecting node to be formed from the node chain of FIG. 10a, and FIG. 11 shows the memory arrangement in accordance with the invention on block diagram level.

It is advantageous to form from a chain of several successive compressed nodes resulting from limited word length a single node collecting such compressed nodes. This collecting node is formed in such a way that the pointer of the collecting node is set to point to the child of the compressed node that is last in said chain, the sum of the numbers of bits searched in the compressed nodes in the chain is set as the number of bits B searched in the collecting node, and the array indices (i.e. search words) produced by bit interleaving are inserted in the list or table T of the node in the order in which they appear in the successive compressed nodes. Thus, the collecting node will be a node CN4 as shown in FIG. 10b, comprising three parts: field 130 containing a pointer to said lower-level node, field 131 containing the number of searched bits B (the above sum), and list or table T containing in succession the array indices produced by bit interleaving. This third part thus has a varying size. In the example of the figure, the number of indices is three, since the example of FIG. 10a comprises three successive nodes.

The number of elements (i.e., indices) NE in table T is obtained from the number of searched bits B as follows:

$$NE = \begin{cases} B/W, \text{ if } B \text{ MOD} W = 0 \\ \lfloor B/W \rfloor + 1, \text{ if } B \text{ MOD} W \neq 0 \end{cases}$$

where $\lfloor \rfloor$ is a floor function truncating decimals from the number, W is the word length used, e.g. 32, and MOD refers to modulo arithmetic. Thus, the number of indices need not be stored in the collecting node as separate data, but it can be found on the basis of the number of searched bits.

The number of bits B' needed to calculate the last index in the table (denoted by reference b" in the figure), which does not necessarily equal the word length, is obtained as follows:

$$B' = \begin{cases} W, \text{ if } B \text{ MOD} W = 0 \\ B \text{ MOD} W, \text{ if } B \text{ MOD} W \neq 0 \end{cases}$$

By forming a collecting node from several successive compressed nodes, the number of memory references (pointers) can be reduced further. In present-day computer architecture, comprising caches of various levels, memory references require considerable computation time, and hence the computation time will be diminished. At the same time, the need for storage space for pointers is eliminated.

By means of compressed nodes, the storage requirement can be effectively minimized particularly in conjunction with non-uniform key distributions, since by means of compression the depth of the structure can be arbitrarily increased on a local basis without increased storage space requirement.

As was already indirectly stated above, in the memory in accordance with the invention a bucket cannot be preceded by a compressed node, but the parent node is always either an ordinary quad node or an empty element. Hence, a compressed node cannot point to a bucket, but it always points either to another compressed node or to an ordinary quad node. An empty element means that if the total number of records is smaller that the number of pointers/records that the bucket can accommodate, a tree-shaped structure is not needed yet, but one bucket will suffice in the structure (in which case said node is conceptually preceded by an empty element). It is advantageous to proceed in this way at the initial phase of starting up the memory. It is thus worthwhile starting building up the tree-shaped structure only when this is necessary.

In other respects, the retrievals, insertions and deletions performed in the memory are made in a manner known per se. In this regard, reference is made e.g. to the international application mentioned at the beginning, providing a more detailed description of collision situations in association with insertions, for example. Instead of conventional deletion updating, the structure may also employ functional updating implemented by known methods by copying the path from root to buckets.

As already stated at the beginning, the principles described above also relate to a bucketless trie structure. In such a case, the equivalent of a bucket is a data unit (to which a leaf node in the bucketless structure points). In the bucketless alternative, a problem will be presented by what type the root node must have when the structure only has one data unit (which is pointed to from the root node). In principle, there are two alternatives for implementing the root node. In accordance with the first alternative, the root may in this case have a quad node containing only one pointer. In accordance with the second, more advantageous alternative the root node is a compressed node directly referring to said data unit. Thus, in the case of one data unit the bucketless alternative must include this exception to the above rules.

Figure 11:
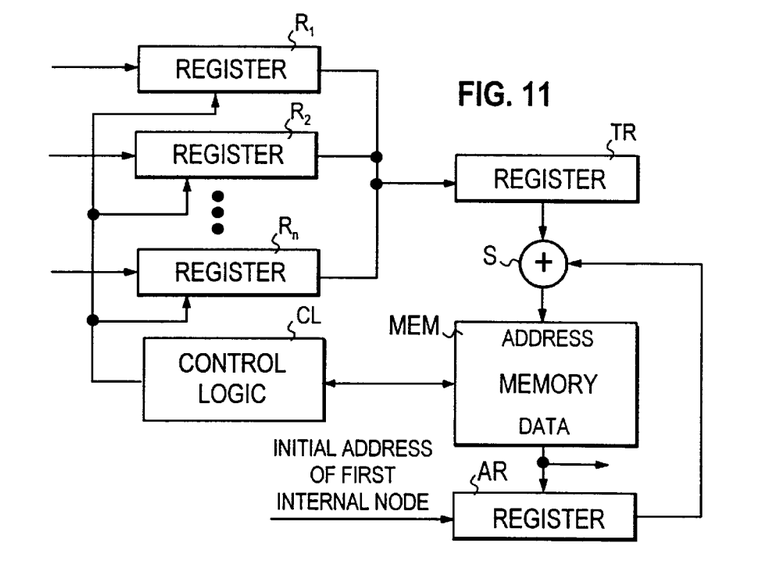

FIG. 11 shows a memory in accordance with the invention on block diagram level. Each dimension has a dedicated input register, and hence there is a total of n input registers. The search key of each dimension is stored in these input registers, denoted by references $R_1 \ldots R_n$, each key in a register of its own. The input registers are connected to a register TR in which the above-described search word is formed in accordance with the bit interleaving method described above. The register TR is connected via adder S to the address input of memory MEM. The output of the memory in turn is connected to address register AR the output of which in turn is connected to adder S. Initially the bits selected from each register are read into the common register TR in the correct order. In each ordinary quad node, two bits are selected from the registers, but with a compressed node the number of selected bits varies according to the number of bits to be searched in said node. The initial address of the first trie node is first stored in the address register AR, and the address obtained as an offset address from register TR is added to the initial address in adder S. The resulting address is supplied to the address input of the memory MEM, and the data output of the memory provides the initial address of the next trie node, the address being written into the address register AR over the previous address stored therein. Thereafter the next selected bits are again loaded from the input registers into the common register TR in the correct order, and the array address thus obtained is added to the initial address of the relevant array (i.e., trie node), obtained from the address register AR. This address is again supplied to the address input of the memory MEM, the data output of the memory thereafter providing the initial address of the next node. The above-described procedure is repeated until the desired point has been accessed and recordal can be performed or the esired record read.

Control logic CL attends to the maintenance of the memory structure and to the correct number of bits being extracted from the registers in each compressed node.

The rapidity of the address computation can be influenced by the type of hardware configuration chosen. Since progress is by way of the above-stated bit manipulations, address computation can be accelerated up by shifting from use of one processor to a multiprocessor environment in which parallel processing is carried out. An alternative implementation to the multiprocessor environment is an ASIC circuit.

Even though the invention has been described in the above with reference to examples in accordance with the accompanying drawings, it is obvious that the invention is not to be so restricted, but it can be modified within the scope of the inventive idea disclosed in the appended claims. The address computation may also continue in the bucket, providing that unsearched bits remain. The structure may also be implemented for keys of variable length. The address computation may also continue in the bucket, providing that unsearched bits remain. The definition of a bucket given at the beginning is thus to be broadened to read that a bucket is a data structure that may also contain another trie structure. Hence, several directory structures in accordance with the present invention can be linked in succession in such a way that another directory structure (that is, another trie structure) is stored in a bucket, or a pointer contained in a bucket or a leaf points to another directory structure. Reference from a bucket or a leaf is made directly to the root node of the next directory structure. Generally, it may be stated that a bucket contains at least one element so that the type of an individual element is selected from a group comprising a data unit, a pointer to a stored data unit, a pointer to another directory structure and another directory structure. The detailed implementation of buckets is dependent on the application. In many cases, all elements in buckets may be of the same type, being e.g. either a data unit or a pointer to a data unit. On the other hand, for instance in an application in which character strings are stored in the memory the bucket may contain element pairs in such a way that all pairs in the bucket are either pointer to data unit/pointer to directory structure pairs or data unit/pointer to a directory structure pairs or data unit/directory structure pairs. In such a case, for example, the prefix of the character string may be stored in the data unit and the search may be continued from the directory structure that is the pair of the data unit.

What is claimed is:

1. A method for implementing a memory, in which memory data is stored as data units for each of which a dedicated storage space is assigned in the memory, in accordance with which method the memory is implemented as a directory structure comprising a tree-shaped hierarchy having nodes at several different levels, wherein an individual node can be (i) a trie node comprising an array wherein an individual element may contain the address of a lower node in the tree-shaped hierarchy and wherein an individual element may also be empty, or (ii) a bucket containing at least one element so that the type of an individual element in the bucket is selected from a group including a data unit, a pointer to a stored data unit, a pointer to another directory structure and another directory structure, in at least part of the directory structure sets of successive trie nodes are replaced with compressed nodes in such a way that an individual set made up by successive trie nodes, from each of which there is only one address to a trie node at a lower level, is replaced with a compressed node (CN), address computation performed in the directory structure comprises the steps of (a) selecting in the node at the uppermost level of the tree-shaped hierarchy a predetermined number of bits from the bit string formed by the search keys employed, forming from the selected bits a search word with which the address of the next node is sought in the node, and proceeding to said node, (b) selecting from the unselected bits in the bit string formed by the search keys employed a predetermined number of bits and forming from the selected bits a search word with which the address of a further new node at a lower level is sought from the array of the node that has been accessed, repeating step (b) until an empty element is encountered or until the address of the new node at a lower level is the address of a bucket, characterized by implementing the arrays in the trie nodes as quad nodes having a fixed size of four elements, storing in an individual compressed node an address to the quad node that the lowest node in the set to be replaced points to, the value of the search word by means of which said address is found, and the total number of bits from which search words are formed in the set to be replaced, whereby said compressed nodes are formed so that said total number in a compressed node is smaller than or equal to the word length employed, and further compressing chains of several successive compressed nodes by replacing a single chain with a single collecting node (CN4) storing the sum of said total numbers in said successive compressed nodes, and a list of the values of the search words obtained from said successive compressed nodes.

2. A method as claimed in claim 1, characterized in that sets of successive quad nodes are replaced in the entire directory structure so that all said sets are replaced with compressed nodes.

3. A method as claimed in claim 1, characterized in that several successive compressed nodes are formed in the directory structure in such a way that at least in the compressed node at the uppermost level said total number corresponds to the word length employed.

4. A method as claimed in claim 1, characterized in that the search word values are stored in the list in the order in which they appear in said successive compressed nodes.

5. A method as claimed in claim 1, characterized in that in all uncompressed quad nodes of the memory, at least two addresses to a lower-level node are maintained.

6. A method for implementing a memory, in which memory data is stored as data units for each of which a dedicated storage space is assigned in the memory, in accordance with which method the memory is implemented as a directory structure comprising a tree-shaped hierarchy having nodes at several different levels, wherein an individual node can be (i) an internal node comprising an array wherein an individual element may contain the address of a lower node in the tree-shaped hierarchy and wherein an individual element may also be empty, or (ii) a leaf containing at least one element the type of which is one from a group including a pointer to a stored data unit and a pointer to a node in another directory structure, in at least part of the directory structure sets of successive internal nodes are replaced with compressed nodes in such a way that an individual set made up by successive internal nodes, from each of which there is only one address to an internal node at a lower level, is replaced with a compressed node (CN), address computation performed in the directory structure comprises the steps of (a) selecting in the node at the uppermost level of the tree-shaped hierarchy a predetermined number of bits from the bit string formed by the search keys employed, forming from the selected bits a search word with which the address of the next node is sought in the node, and proceeding to said node, (b) selecting from the unselected bits in the bit string formed by the search keys employed a predetermined number of bits and forming from the selected bits a search word with which the address of a further new node at a lower level is sought from the array of the node that has been accessed, repeating step (b) until an empty element is encountered or until the address of the new node at a lower level is the address of a leaf, characterized by implementing the arrays in the internal nodes as quad nodes having a fixed size of four elements, storing in an individual compressed node an address to the quad node that the lowest node in the set to be replaced points to, the value of the search word by means of which said address is found, and the total number of bits from which search words are formed in the set to be replaced, whereby said compressed nodes are formed so that said total number in a compressed node is smaller than or equal to the word length employed, and further compressing chains of several successive compressed nodes by replacing a single chain with a single collecting node (CN4) storing the sum of said total numbers in said successive compressed nodes, and a list of the values of the search words obtained from said successive compressed nodes.

7. A method as claimed in claim 6, characterized in that sets of successive internal nodes are replaced in the entire directory structure in such a way that all said sets are replaced with compressed nodes.

8. A method as claimed in claim 6, characterized in that several successive compressed nodes are formed in the directory structure in such a way that at least in the compressed node at the uppermost level said total number corresponds to the word length employed.

9. A method as claimed in claim 8, characterized in that the search word values are stored in the list in the order in which they appear in said successive compressed nodes.

10. A method as claimed in claim 6, characterized in that in all uncompressed quad nodes of the memory, at least two addresses to a lower-level node are maintained.

* * * * *